(12) United States Patent
Randall et al.

(10) Patent No.: US 11,161,312 B2
(45) Date of Patent: Nov. 2, 2021

(54) TIRE SEALANT COMPOSITION

(71) Applicants: Bridgestone Americas Tire Operations, LLC, Nashville, TN (US); Bridgestone Corporation, Chuo-Ku (JP)

(72) Inventors: Amy M. Randall, Brentwood, TN (US); Ludovica Caliano, Pomezia (IT); Benjamin C. Galizio, Kent, OH (US); Raffaele di Ronza, Rome (IT); Claudia Aurisicchio, Rome (IT); Giuseppe Pezzullo, Rome (IT)

(73) Assignees: Bridgestone Corporation, Chuo-ku (JP); Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/895,517

(22) Filed: Jun. 8, 2020

(65) Prior Publication Data
US 2020/0298510 A1 Sep. 24, 2020

Related U.S. Application Data

(62) Division of application No. 16/096,569, filed as application No. PCT/US2017/029623 on Apr. 26, 2017, now Pat. No. 10,675,822.

(60) Provisional application No. 62/328,935, filed on Apr. 28, 2016.

(51) Int. Cl.
| | |
|---|---|
| *B29C 73/16* | (2006.01) |
| *B29D 30/06* | (2006.01) |
| *C08L 7/00* | (2006.01) |
| *C08L 23/24* | (2006.01) |
| *C08L 91/00* | (2006.01) |
| *C08K 3/04* | (2006.01) |

(52) U.S. Cl.
CPC ........ *B29C 73/163* (2013.01); *B29D 30/0685* (2013.01); *C08L 7/00* (2013.01); *C08L 23/24* (2013.01); *C08L 91/00* (2013.01); *C08K 3/04* (2013.01); *C08L 2205/03* (2013.01)

(58) Field of Classification Search
CPC ..... B29C 73/63; B29D 30/0685; C08L 23/24; C08L 7/00; C08L 91/00
See application file for complete search history.

(56) References Cited

U.S. PATENT DOCUMENTS

| | | | |
|---|---|---|---|
| 2,818,902 | A | 1/1958 | Schutz |
| 2,905,220 | A | 9/1959 | Schutz |
| 4,032,500 | A | 6/1977 | Koch et al. |
| 4,228,839 | A | 10/1980 | Bohm et al. |
| 4,369,053 | A | 8/1983 | Davis et al. |
| 4,528,331 | A | 7/1985 | Bohm et al. |
| 4,616,048 | A | 10/1986 | DeTrano et al. |
| 6,194,485 | B1 | 2/2001 | Hogan et al. |
| 6,217,683 | B1 | 4/2001 | Balzer et al. |
| 6,303,694 | B1 | 10/2001 | Hogan et al. |
| 6,386,251 | B1 | 5/2002 | Koch et al. |
| 6,546,982 | B1 | 4/2003 | Brown et al. |
| 6,885,291 | B1 | 4/2005 | Pollack et al. |
| 7,388,041 | B2 | 6/2008 | Cegelski et al. |
| 7,900,665 | B2 | 3/2011 | Shimura |
| 8,226,783 | B2 | 7/2012 | Shimura |
| 8,237,553 | B2 | 8/2012 | Wilson et al. |
| 8,266,465 | B2 | 9/2012 | Hardman et al. |
| 8,511,156 | B2 | 8/2013 | Kutzscher |
| 8,596,117 | B2 | 12/2013 | Wilson et al. |
| 8,776,590 | B2 | 7/2014 | Kempf et al. |
| 8,984,936 | B2 | 3/2015 | Brusarosco et al. |
| 9,016,118 | B2 | 4/2015 | Townsend et al. |
| 9,016,339 | B2 | 4/2015 | Tanno et al. |
| 9,022,086 | B2 | 5/2015 | Tanno et al. |
| 2003/0230369 | A1 | 12/2003 | Domer et al. |
| 2004/0127616 | A1 | 7/2004 | Wentworth et al. |
| 2007/0129464 | A1 | 6/2007 | Fogal, Sr. |
| 2009/0173422 | A1 | 7/2009 | Utsumi et al. |
| 2010/0179275 | A1 | 7/2010 | Nakakita |
| 2011/0086944 | A1 | 4/2011 | Schunack et al. |
| 2014/0261944 | A1 | 9/2014 | Papakonstantopoulos et al. |
| 2014/0360019 | A1 | 12/2014 | Brusarosco et al. |
| 2016/0068031 | A1 | 3/2016 | Kaszas et al. |

FOREIGN PATENT DOCUMENTS

WO 2012165386 A1 12/2012

OTHER PUBLICATIONS

Extended European Search Report and Opinion from EP application No. 17790340.8, dated Nov. 14, 2019.
"Cyber Fleet" pages from httpJ/wv,m.pirelli.com/mediaObject!pireilityre/ww/en/extra-cata!ogue/truck/fleet_solutions/CyberFleet_Flotte_EN/origina!/CyberFleet_Flotte_EN.pdf, identified Jun. 23, 2015 (4 pages).
Kim, Sun Hee, International Search Report with Written Opinion from PCT/US2017/029623, 15 pp. (dated Jul. 27, 2017).
Kinnane, Phi!, "Piezoelectric Energy Harvester Helps Increase a Car's Efficiency", downloaded from http://www.comsol.com/blogs/piezoe!ectric-energy-harvester-increases-car-efficiency, 5 pp. (Jul. 26, 2012).
"Sensors, Receivers, Operator Interface and OTR-TMS Manager" pages from http:f/ww,v.schraderinternational.com/~/media/Schrader/Files/Document%20Ubrary%20PDFs/Europe/OTR%20Kit%20PU151Collateral110111EN.ashx, identified Jun. 23, 2015.
"TMS Tire Monitor System" pages from http://www.ambrom!ey.eo.uk/tms/, identified Jun. 23, 2015 (1 page).
Williams, Stephen, "Smarter Sensor for Tire Monitors", downloaded from http:/www.nytimes.com/2010/12/12/automobiles/12TIRE.html?_r=0, 3 pp. (Dec. 10, 2010).

*Primary Examiner* — Edward J Cain
(74) *Attorney, Agent, or Firm* — Meredith E. Hooker; Jenny L. Sheaffer

(57) ABSTRACT

Disclosed herein are a sealant composition for use with tires, a tire having at least one component with at least one surface at least partially coated with the sealant composition, and related methods for applying the sealant composition to tires. The sealant composition comprises biorubber and a softener comprising at least one of plant oil or plant resin and has a non-petroleum content of at least 70% by weight.

20 Claims, No Drawings

TIRE SEALANT COMPOSITION

CROSS-REFERENCE TO RELATED APPLICATION

This application is a division of U.S. patent application Ser. No. 16/096,569, filed Oct. 25, 2018 and assigned U.S. Pat. No. 10,675,822, which is a national stage application of PCT application number PCT/US2017/029623 filed Apr. 26, 2017, which claims priority to and any other benefit of U.S. Provisional Patent Application Ser. No. 62/328,935, filed Apr. 28, 2016, and entitled "TIRE SEALANT COMPOSITION," the entire disclosure of each of which is incorporated by reference herein.

FIELD

The present application is directed to a sealant composition for use with tires. Also disclosed are tires having at least one component with at least one surface at least partially coated with the sealant composition as well as related methods for applying the sealant composition to tires.

BACKGROUND

Sealant compositions may be used in pneumatic tires to improve an installed tire's durability when the vehicle upon which the tire is installed is operated. Use of the sealant composition may enable the pneumatic tire to withstand a puncture from a sharp object such as a nail. By incorporating a sealant composition into an interior portion of a pneumatic tire, one or more punctures which could otherwise render the vehicle inoperable or require repair can be plugged by flow or movement of the sealant composition into the hole created by the puncture.

SUMMARY

Disclosed herein are a sealant composition for use with tires, a tire having at least one component with at least one surface at least partially coated with the sealant composition, and related methods for applying the sealant composition to tires.

In a first embodiment, a sealant composition for use with tires is disclosed. The sealant composition comprises biorubber and a softener comprising at least one of plant resin or plant oil, and optionally a cure package, wherein the sealant composition contains at least 70 weight % (based upon the total weight of the sealant composition) non-petroleum ingredients including the biorubber, and plant resin or plant oil, and the sealant composition has a viscosity of 200 to 500 Pa-S at 100° C.

In a second embodiment, a tire comprising at least one component in contact with a sealant composition according to the first embodiment is disclosed.

In a third embodiment, a method for applying a sealant composition to a tire is disclosed. The method comprises: providing a tire comprising at least one of the following components: a tread, one or more body or carcass plies, one or more cap plies, one or more belt plies, a sidewall, or an air barrier layer; and applying a sealant composition according to the first embodiment to a portion of at least one radially inner surface of at least one of the components of the tire.

DETAILED DESCRIPTION

Disclosed herein are a sealant composition for use with tires, a tire having at least one component with at least one surface at least partially coated with the sealant composition, and related methods for applying the sealant composition to tires.

In a first embodiment, a sealant composition for use with tires is disclosed. The sealant composition comprises biorubber and a softener comprising at least one of plant resin or plant oil, and optionally a cure package, wherein the sealant composition contains at least 70 weight % (based upon the total weight of the sealant composition) non-petroleum ingredients including the biorubber, and plant resin or plant oil, and the sealant composition has a viscosity of 200 to 500 Pa-S at 100° C.

In a second embodiment, a tire comprising at least one component in contact with a sealant composition according to the first embodiment is disclosed.

In a third embodiment, a method for applying a sealant composition to a tire is disclosed. The method comprises: providing a tire comprising at least one of the following components: a tread, one or more body or carcass plies, one or more cap plies, one or more belt plies, a sidewall, or an air barrier layer; and applying a sealant composition according to the first embodiment to a portion of at least one radially inner surface of at least one of the components of the tire.

Definitions

As used herein, the term "majority" means 51% by weight or more.

As used herein, the term "natural rubber" or NR means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

For the purpose of the present disclosure, any reference to a percent amount of a component in the sealant composition means a percent by weight, unless otherwise specified. Similarly, any reference to ratios of component amounts in the sealant composition means the ratios by weight, unless otherwise specified. Unless stated to the contrary, discussions herein relating to the components and amounts of the sealant compositions of the present disclosure should be understood to apply equally to the other embodiments, e.g., the related methods and the tires containing the sealant compositions, as disclosed herein as the third and second embodiments.

Sealant Composition

As discussed above, the first embodiment disclosed herein is directed to a sealant composition for use with tires. By stating that the sealant composition is for use with tires is meant that it is suitable for use with various types of tires, especially pneumatic tires. The sealant composition according to the first embodiment may be considered especially suitable for acting as a plug in response to a puncture of the tire. As discussed above, the sealant composition of the first embodiment can be utilized in the tire of the second embodiment and in the method of the third embodiment. Thus, the various aspects of the sealant composition of the first embodiment as discussed herein and below should be understood as applying equally to the sealant composition utilized in the second and third embodiments described herein. In other words, the various aspects of the sealant composition of the first embodiment can be utilized in embodiments of the second and third embodiments disclosed herein.

The sealant composition of the first embodiment comprises biorubber and a softener comprising at least one of plant resin or plant oil. One or more than one biorubber can be utilized in the sealant compositions of the first embodiment. The softener component of the sealant compositions of the first embodiment comprises at least one of plant resin or plant oil. In other words, the softener of the sealant compositions of the first embodiment comprises plant resin, plant oil, or a combination thereof. In certain embodiments of the first embodiment, the softener component of the sealant composition consists of plant resin, plant oil, or a combination thereof. When plant resin is utilized in an embodiment of the sealant composition, one or more than one plant resin, or one or more than one source of plant resin may be utilized. When plant oil is utilized in an embodiment of the sealant composition, one or more than one plant oil, or one or more than one source of plant oil may be utilized.

As discussed above, the sealant composition contains (comprises) at least 70 weight % non-petroleum ingredients (based upon the total weight of the sealant composition) including the biorubber, and plant resin and/or plant oil. Non-petroleum ingredients are ingredients produced from sources other than petroleum products. For example, most commercially available styrene-butadiene rubbers are produced from 1,3-butadiene and styrene monomers which have been sourced from (produced from) petroleum products. In contrast, a biorubber such as guayule natural rubber would be considered to be a non-petroleum ingredient as would a biorubber produced from monomers made from non-petroleum ingredients (e.g., styrene made from cinnamic acid by yeast cells). According to the first embodiment at least the biorubber as well as any plant resin and plant oil present in the sealant composition contribute to the amount of non-petroleum ingredients. In certain embodiments of the first embodiment, additional ingredients may contribute to the amount of non-petroleum ingredients, e.g., certain fillers and/or various components of a cure package (when present). In certain embodiments of the first embodiment, the sealant composition contains (comprises) at least 75 weight %, at least 80 weight %, at least 85 weight %, at least 90 weight %, at least 95 weight %, at least 98 weight %, at least 99 weight % or even 100 weight % non-petroleum ingredients (based upon the total weight of the sealant composition).

As discussed above, according to the first embodiment disclosed herein, the sealant composition has a viscosity of 200 to 500 Pa*s (i.e., in units of Pascal*seconds) at 100° C. Such viscosity refers to the kinematic or absolute viscosity of the sealant composition. One Pa*s is equivalent to 1 N s/m$^2$ (i.e., 1 Newton second/meter$^2$) and also equivalent to 1 kg/(m/s) (i.e., 1 kilogram per (meters seconds). Kinematic viscosities can be determined by various methods including ASTM Method D6204 or ISO Method 13145. The viscosities referred to herein for the sealant composition are intended to refer to viscosities measured using the method discussed in the working examples (which is based upon ASTM Method D6204) or an equivalent method, and as measured at 100° C. In certain embodiments of the first embodiment disclosed herein, the sealant composition has a viscosity of about 200 to about 500 Pa*s at 100° C., 200 to 500 (e.g., 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500) Pa*s at 100° C., about 250 to about 500 Pa*s at 100° C., 250 to 500 Pa*s at 100° C., about 250 to about 450 Pa*s at 100° C., 250 to 450 Pa*s at 100° C., about 260 to about 450 Pa*s at 100° C., 260 to 450 Pa*s at 100° C., about 270 to about 450 Pa*s at 100° C., 270 to 450 Pa*s at 100° C., about 280 to about 450 Pa*s at 100° C., 280 to 450 Pa*s at 100° C., about 290 to about 450 Pa*s at 100° C., 290 to 450 Pa*s at 100° C., about 300 to about 450 Pa*s at 100° C., 300 to 450 Pa*s at 100° C., about 310 to about 450 Pa*s at 100° C., 310 to 450 Pa*s at 100° C., about 320 to about 450 Pa*s at 100° C., 320 to 450 Pa*s at 100° C., about 250 to about 440 Pa*s at 100° C., 250 to 440 Pa*s at 100° C., about 250 to about 430 Pa*s at 100° C., 250 to 430 Pa*s at 100° C., about 250 to about 420 Pa*s at 100° C., 250 to 420 Pa*s at 100° C., about 250 to about 410 Pa*s at 100° C., 250 to 410 Pa*s at 100° C., about 250 to about 400 Pa*s at 100° C., or 250 to 400 Pa*s at 100° C. In certain preferred embodiments of the first embodiment, the sealant composition has a viscosity of 300 to 450 Pa*s at 100° C., or 300 to 400 Pa*s at 100° C.

In certain embodiments of the first embodiment, the sealant composition will remain tacky (at room temperature, 25° C.) even after any curing such that an object (such as a coin) dropped onto the sealant composition from a height of 12 inches will stick sufficiently to the surface of the sealant composition that tipping or turning upside down will not dislodge the object. In certain embodiments of the first embodiment, the tackiness of the sealant composition (at room temperature) is at least 1000 Newtons as measured by a strain gauge using the following test. A nail is driven into a sample of rubber tire that has been coated on its interior surface with sealant composition, preferably the nail is driven until its head rests against the outer surface of the tire and the end of the nail passes into (and optionally entirely through) the sealant composition. Thereafter, the force required to remove the nail from the tire is measured (in Newtons) with a strain gauge. Higher force measurements are indicative of higher tackiness in the sealant composition. In certain embodiments of the first embodiment, the tackiness of the sealant composition (at room temperature) is about 800 to about 3000 (e.g., 800, 900, 1000, 1100, 1200, 1300, 1400, 1500, 1600, 1700, 1800, 1900, 2000, 2100, 2200, 2300, 2400, 2500, 2600, 2700, 2800, 2900, 3000) Newtons (as measured by a strain gauge using the preceding test), including 800-3000 Newtons, about 800 to about 2500 Newtons, 800-2500 Newtons, about 800 to about 1500 Newtons, 800-1500 Newtons, about 900 to about 3000 Newtons, 900-3000 Newtons, about 900 to about 2500 Newtons, 900-2500 Newtons, about 900 to about 1500 Newtons, or 900-1500 Newtons. Alternatively, tackiness can be measured by various methods, including ASTM Method D2979. It should be understood that the foregoing tackiness descriptions including the ranges provided apply equally to certain embodiments of the second embodiment (e.g., in describing suitable sealant compositions for use on a tire component) and to certain embodiments of the third embodiment (e.g., in describing suitable sealant compositions for use in the method of the third embodiment).

The relative amounts of biorubber and softener utilized in the sealant compositions according to the first embodiment disclosed herein may vary. In certain embodiments of the first embodiment, the biorubber is present in an amount of about 15 to about 90 weight % (based upon the total weight of the sealant composition), including 15 to 90% (e.g., 15, 20, 25, 30, 35, 40, 45, 50, 55, 60, 65, 70, 75, 80, 85, or 90%) by weight, about 20 to about 85% by weight, 20 to 85% by weight, about 25 to about 85% by weight, 25 to 85% by weight, about 30 to about 85% by weight, 30 to 85% by weight, about 20 to about 80% by weight, 20 to 80% by weight, about 25 to about 80% by weight, 25 to 80% by weight, about 30 to about 80% by weight, 30 to 80% by weight, about 20 to about 75% by weight, 20 to 75% by weight, about 25 to about 75% by weight, 25 to 75% by weight, about 30 to about 75% by weight, 30 to 75% by weight, about 20 to about 70% by weight, 20 to 70% by weight, about 25 to about 70% by weight, 25 to 70% by weight, about 30 to about 70% by weight, 30 to 70% by weight, about 20 to about 65% by weight, 20 to 65% by weight, about 25 to about 65% by weight, 25 to 65% by weight, about 30 to about 65% by weight, 30 to 65% by weight, about 20 to about 60% by weight, 20 to 60% by weight, about 25 to about 60% by weight, 25 to 60% by weight, about 30 to about 60% by weight, 30 to 60% by weight, about 20 to about 55% by weight, 20 to 55% by weight, about 25 to about 55% by weight, 25 to 55% by weight, about 30 to about 55% by weight, 30 to 55% by weight, about 20 to about 51% by weight, 20 to 51% by weight, about 25 to about 51% by weight, 25 to 51% by weight, about 30 to about 51% by weight, 30 to 51% by weight, about 20 to about 50% by weight, 20 to 50% by weight, about 25 to about 50% by weight, 25 to 50% by weight, about 30 to about 50% by weight, 30 to 50% by weight, about 35 to about 90% by weight, 35 to 90% by weight, about 40 to about 90% by weight, 40 to 90% by weight, about 45 to about 90% by weight, 45 to 90% by weight, about 50 to about 90% by weight, 50 to 90% by weight, about 51 to about 90% by weight, or 51 to 90% by weight. When more than one biorubber is present, the foregoing ranges should be understood to refer to the total amount of all biorubbers. In those embodiments of the first embodiment wherein the biorubber of the sealant composition has a lower Mw (e.g., 175,000 or less), the amount of biorubber may preferably be somewhat larger such as about 30 to about 90% by weight (30 to 90% by weight) or even about 40 to about 80% by weight (40 to 80% by weight) to accord for less oil being used in the overall sealant composition; the foregoing ranges should be understood to include intermediary ranges and amounts, e.g., 30 to 90 includes 30, 35, 40, 45, 50, 55, 60, 65, 70, 75, 80, 85, and 90 and 40 to 80 includes 40, 45, 50, 55, 60, 65, 70, 75, and 80. In certain embodiments of the first embodiment, the softener of the sealant composition is present in an amount of about 10 to about 85 weight % (based upon the total weight of the sealant composition), including 10 to 85 weight %, about 10 to about 80 weight%, 10 to 80 weight %, about 10 to about 75 weight %, 10 to 75 weight %, about 10 to about 70 weight %, 10 to 70 weight %, about 10 to about 65 weight %, 10 to 65 weight %, about 10 to about 60 weight %, 10 to 60 weight %, about 10 to about 55 weight %, 10 to 55 weight %, about 10 to about 50 weight %, 10 to 50 weight %, about 15 to about 85 weight %, 15 to 85 weight %, about 15 to about 80 weight %, 15 to 80 weight %, about 15 to about 75 weight %, 15 to 75 weight %, about 15 to about 70 weight %, 15 to 70 weight %, about 20 to about 85 weight %, 20 to 85 weight %, about 20 to about 80 weight %, 20 to 80 weight %, about 20 to about 75 weight %, 20 to 75 weight %, about 20 to about 70 weight %, 20 to 70 weight %, about 25 to about 70 weight %, 25 to 70 weight %, about 30 to about 85 weight %, 30 to 85 weight %, about 30 to about 80 weight %, 30 to 80 weight %, about 30 to about 85 weight %, 30 to 85 weight %, about 30 to about 70 weight %, 30 to 70 weight %, about 35 to about 70 weight %, or 35 to 70 weight %. In those embodiments of the first embodiment wherein the biorubber of the sealant composition has a lower Mw (e.g., 175,000 or less), the amount of biorubber may preferably be somewhat larger (as discussed above), and accordingly the amount of softener may be somewhat lower such as about 10 to about 85% by weight (10 to 85% by weight) or even about 15 to about 50% by weight (15 to 50% by weight) to accord for less oil being used in the overall sealant composition; the foregoing ranges should be understood to include intermediary ranges and amounts, e.g., 10 to 85 includes 10, 15, 20, 25, 30, 35, 40, 45, 50, 55, 60, 65, 70, 75, 80 and 85 and 15 to 50 includes 15, 20, 25, 30, 35, 40, 45, and 50.

In certain embodiments of the first embodiment, the sealant composition consists of biorubber and a softener either comprising or consisting of a plant resin. In certain embodiments of the first embodiment, the sealant composition consists of biorubber and a softener either comprising or consisting of a plant oil. In certain embodiments of the first embodiment, the sealant composition consists of biorubber and a softener either comprising or consisting of: a plant resin, a plant oil or a combination thereof. In certain embodiments of the first embodiment, the softener of the sealant composition either comprises or consists of a plant resin which is present in an amount of about 10 to about 45 weight % (based upon the total weight of the sealant composition), including 10 to 45 weight %, about 10 to about 40% by weight, 10 to 40% by weight, about 10 to about 35% by weight, 10 to 35% by weight, about 10 to about 30% by weight, 10 to 30% by weight, about 15 to about 45% by weight, 15 to 45% by weight, about 20 to about 45% by weight, 20 to 45% by weight, about 25 to about 45% by weight, or 25 to 45% by weight; in certain embodiments of the foregoing, the biorubber:plant resin weight ratio is greater than 1:1 (i.e., relatively more biorubber than plant resin is present in the sealant composition on a weight basis).

Biorubber

As discussed above, the sealant composition of the first-third embodiments comprises (includes) biorubber. One or more than one biorubber may be utilized. As used herein, the term biorubber is intended to refer to a rubber that has a modern carbon content of 50-100%. As those of skill in the art will appreciate, petroleum-based hydrocarbons are sourced from fossil fuels or other petroleum products, which by their nature, do not contain any "modern" carbon. Modern carbon, as used herein, refers to the standard set forth in ASTM D6866. Generally speaking, under this standard, modern carbon contains the same $^{14}C$ activity level (including the post-1950 correction) as the original oxalic acid radiocarbon carbon that occurs naturally and is found in plants and animals at approximately the same concentration found in the atmosphere. Due to radioactive decay, fossil fuels lack any measurable $^{14}C$ activity, and, therefore, do not contain any modern carbon, and accordingly, petroleum-based hydrocarbons made from those fossil fuels also do not contain any modern carbon. Non-petroleum ingredients, including the biorubbers (and plant resins and plant oils) disclosed herein, will display $^{14}C$ activity, and therefore will contain modern carbon. In certain embodiments of the first-third embodiments, suitable biorubbers may have a modern carbon content of at least 50%, at least 60%, at least 70%, at least 75%, at least 80%, at least 85%, at least 90%, at least 95%, at least 98% or even 100%, including 50-100%, 50-98%, 50-95%, 50-90%, 50-85%, 50-80%, 50-75%, 50-70%, 50-60%, 60-100%, 60-98%, 60-95%, 60-90%, 60-85%, 60-80%, 60-75%, 60-70%, 70-100%, 70-98%, 70-95%, 70-90%, 70-85%, 70-80%, 70-75%, 75-100%, 75-98%, 75-95%, 75-90%, 75-85%, 75-80%, 80-100%, 80-98%, 80-95%, 80-90%, 85-100%, 85-98%, 85-95%, 85-90%, 90-100%, 90-98%, and 90-95%.

In certain embodiments of the first-third embodiments disclosed herein, the biorubbers may be produced as a polymer or rubber from a plant (e.g., Hevea natural rubber or non-Hevea natural rubber such as sourced from guayule or dandelion), polymerized from one or more biomonomers, or constitute a combination of the foregoing. In certain embodiments of the first-third embodiments disclosed herein, the biorubber comprises at least one of: polyfarnesene, non-Hevea natural rubber, Hevea natural rubber, or a polymer or copolymer comprising at least one conjugated diene-containing non-petroleum monomer optionally in combination with at least one aromatic vinyl non-petroleum monomer. In certain embodiments of the first-third embodiments disclosed herein, the biorubber comprises at least one of: polyfarnesene, non-Hevea natural rubber, Hevea natural rubber, styrene-butadiene rubber, polybutadiene rubber, polyisoprene rubber, styrene-isoprene rubber, styrene-butadiene-isoprene rubber, ethylene propylene diene monomer rubber (also known as EPDM rubber), butyl rubber, or halogenated butyl rubber (e.g., bromobutyl and chlorobutyl rubber). As used herein the term butyl rubber refers to a copolymer of isobutylene and a small amount of a diene-based monomer, typically isoprene or para-methylstyrene. In certain embodiments of the first-third embodiments disclosed herein, the biorubber consists of (i.e., no other rubbers are contained in the sealant composition according to such embodiments) one or more of the following: polyfarnesene, non-Hevea natural rubber, Hevea natural rubber, styrene-butadiene rubber, polybutadiene rubber, polyisoprene rubber, styrene-isoprene rubber, styrene-butadiene-isoprene rubber, ethylene propylene diene monomer rubber (also known as EPDM rubber), butyl rubber, or halogenated butyl rubber. In certain embodiments of the first-third embodiments disclosed herein, the biorubber comprises polyfarnesene. In certain embodiments of the first-third embodiments disclosed herein the polyfarnesene biorubber is produced from monomers of beta-farnesene (which is not only branched but contains a conjugated diene bond). In certain embodiments of the first-third embodiments disclosed herein, at least 90% by weight of the biorubber has a Mw (determined by GPC using a polystyrene standard) of 175,000 or less; in certain such embodiments of the first-third embodiments, at least 95%, at least 98%, or even 100% of the biorubber has a Mw of 175,000 or less. In certain embodiments of the first-third embodiments disclosed herein, the polyfarnesene biorubber has a molecular weight (Mw) of up to about 500,000 kDa (e.g., 500,000; 400,000, 350,000; 300,000; 250,000; 200,000; 150,000; 175,000, 100,000 all in kDa), including up to 500,000 kDa; up to about 400,000 kDa; up to 400,000 kDa; up to about 300,000 kDa; up to 300,000 kDa; up to about 200,000; up to 200,000; up to about 175,000; up to 175,000; about 100,000 to about 500,000 kDa; about 100,000 kDa to 500,000 kDa; about 100,000 to about 300,000 kDa; 100,000 to 300,000 kDa; about 100,000 to about 200,000 kDa; and 100,000 to 200,000 kDa, all as determined by GPC (using a polystyrene standard). In certain embodiments of the first-third embodiments disclosed herein, the biorubber comprises at least one of Hevea rubber or non-Hevea rubber having a molecular weight (Mw) of up to about 2 million grams/mole, including up to 2 million grams/mole (e.g., 2 million, 1.75 million, 1.5 million, 1.25 million, 1 million, 0.75 million, 0.5 million, and less), up to 1.5 million, up to 1 million, 0.5 million to 2 million, 0.75 million to 2 million, 0.5 million to 1.75 million, and 0.75 million to 1.75 million, all using a light scattering method. In certain embodiments of the first-third embodiments disclosed herein, the biorubber comprises non-Hevea natural rubber. In certain embodiments of the first-third embodiments, the biorubber comprises no more than 25%, no more than 15%, no more than 10%, no more than 5%, or 0% by weight Hevea natural rubber. In certain embodiments of the first-third embodiments, the sealant composition comprises no more than 25%, no more than 15%, no more than 10%, no more than 5% or 0% by weight Hevea natural rubber. In certain embodiments of the first-third embodiments, the biorubber comprises no more than 25%, no more than 15%, no more than 10%, no more than 5%, or 0% by weight EPDM rubber. In certain embodiments of the first-third embodiments, the biorubber comprises no more than 25%, no more than 15%, no more than 10%, no more than 5%, or 0% by weight butyl rubber. In certain embodiments of the first-third embodiments disclosed herein, the biorubber comprises at least one polymer or copolymer comprising at least one conjugated diene-containing non-petroleum monomer optionally in combination with at least one aromatic vinyl non-petroleum monomer. The amounts and ranges of biorubber discussed above should be understood to apply to the particular polymers and polymers described herein that may constitute the biorubber. In certain embodiments of the first-third embodiments, the sealant composition comprises no more than 25% by weight of an elastomer that is solid at room temperature (based upon the total weight of the sealant composition); in certain of these embodiments, the amount of elastomer that is solid at room temperature is no more than 20%, no more than 15%, no more than 10%, or no more than 5% by weight (based upon the total weight of the sealant composition).

As those of skill in the art understand, a conjugated diene is a compound that has two double carbon-carbon bonds (i.e., two —C=C— bonds) that are separated by a single bond (i.e., —C—C—); a conjugated diene will contain at least one —C=C—C=C— moiety). The particular structure of the conjugated diene monomer used in the embodiments of the first-third embodiments disclosed herein can vary. Non-limiting examples of suitable conjugated diene monomers according to certain embodiments of the first-third embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diener may be utilized in certain embodiments. In certain embodiments of the first-third embodiments, the conjugated diene monomer comprises 1,3-butadiene. In certain embodiments of the first-third embodiments disclosed herein, the conjugated diene monomer-containing polymer or copolymer is a copolymer which further comprises at least one vinyl aromatic monomer) (i.e., in addition to the conjugated diene monomer). In certain embodiments of the first-third embodiments disclosed herein, the at least one vinyl aromatic monomer comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one vinyl aromatic monomer comprises styrene. In certain embodiments of the first-third embodiments disclosed herein, the at least one conjugated diene monomer comprises 1,3-butadiene and the at least one vinyl aromatic monomer comprises styrene. In certain embodiments of the first-third embodiments disclosed herein, the biorubber comprises a copolymer of isobutylene and a diene monomer (e.g., isoprene or paramethyl styrene).

Various non-petroleum sources of the monomers, polymers and copolymers discussed above exist. As non-limiting examples, polyfarnesene produced from the fermentation of sugarcane can be purchased from Kuraray Co., Ltd. or its U.S.-affiliate Kuraray America Inc. and guayule natural rubber is available from Yulex Corporation (San Diego, Calif.) such as under the product name Yulex Pure™. Isoprene monomers suitable for producing biorubbers can be produced from biobased butanols, pentanols, and combinations, thereof, which can be obtained by thermochemical or fermentation processing of biomass. An exemplary process for converting these biobased alcohols to bioisoprene is described in U.S. Patent Application Publication No. 2010/0216958, the contents of which are incorporated herein by reference. Alternatively, examples of a biobased isoprene source include carbohydrates, glycerol, glycerine, dihydroxyacetone, single-carbon sources, animal fat, animal oils, fatty acids, lipids, phospholipids, glycerolipids, monoglycerides, diglycerides, triglycerides, polypeptides, yeast extracts, and combinations thereof. An exemplary process for converting these biobased sources to isoprene is described in U.S. Patent Application Publication No. 2011/0237769, the contents of which are incorporated herein by reference. Styrene monomers suitable for producing biorubbers can be produced from ingredients such as cinnamic acid, derivatives of cinnamic acid, syngas (i.e., biobased syngas such as syngas from biomass), methane (i.e., biobased methane such as methane from biomass), ethanol, butanol, and combinations thereof. Cinnamic acid can be obtained from cinnamon oil; resinous exudates from balsam trees, e.g., storax; fat extracts from shea trees, e.g., shea butter; and deamination of L-phenylalanine made from biomass. Biobased derivatives of cinnamic acid, such as hydrocinnamic acid, are, as their name implies, derived from biobased cinnamic acid. Biobased hydrocinnamic acid can be obtained by hydrogenating biobased cinnamic acid. Biobased syngas, which typically contains hydrogen, carbon monoxide, and carbon dioxide, can be obtained through the gasification of biomass. Biobased methane can be produced by the catalytic conversion of a biobased syngas. Biobased butanol and biobased ethanol, can be produced by the fermentation of biomass. For example, each of butanol and ethanol can be produced by the acetone-butanol-ethanol method of fermentation, which is the bacterial fermentation of carbohydrates such as starch in the absence of oxygen. Biobased ethanol can also be produced from yeast fermentation of carbohydrates such as cellulose. Non-Hevea sources of natural rubber include, but are not limited to, *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata,* et al (milkweeds), *Solidago altissima, graminifolia rigida,* et al (goldenrods), *Cacalia atripilicifolia* (pale Indian plantain), *Pycnanthemum incanum* (mountain mint), *Teucreum canadense* (American germander) and *Campanula Americana* (tall bellflower). In certain embodiments of the first-third embodiments disclosed herein, the biorubber is sourced from one or more of the foregoing plants. In certain embodiments of the first-third embodiments disclosed herein, the biorubber is sourced from at least one of *Parthenium argentatum* (Guayule shrub) or *Taraxacum Kok-Saghyz* (Russian dandelion). In certain embodiments of the first-third embodiments disclosed herein, the biorubber is sourced from *Parthenium argentatum* (Guayule shrub); according to such embodiments such biorubber may alternatively be described as guayule natural rubber. Other plants which produce rubber and rubber-like hydrocarbons are known, particularly among the Compositae, Euphorbiaceae, Campanulaceae, Labiatae, and Moracea families.

In certain embodiments of the first-third embodiments disclosed herein, the biorubber is extended with at least a portion of the plant resin and/or plant oil. By extended with is meant that the biorubber contains at least a portion of the plant resin, at least a portion of the plant oil, or at least a portion of plant resin and plant oil that is contained in the overall sealant composition. In certain embodiments of the first-third embodiments disclosed herein, the biorubber is extended with at least a portion of the plant resin, at least a portion of the plant oil, or at least a portion of both by pre-mixing the biorubber with a quantity of plant resin, plant oil or both. In certain embodiments of the first-third embodiments disclosed herein, the biorubber is extended with at least a portion of the plant resin as a result of an inherent amount of plant resin being contained with the plant source of the biorubber; in certain such embodiments the amount of plant resin in the biorubber comprises up to 10% (e.g., 10%, 9%, 8%, 7%, 6%, 5%, 4%, 3%, 2%, 1%, or less than 1%), including 0.01 to 10% by weight of the biorubber. A non-limiting example of a biorubber extended with at least a portion of the plant resin as a result of the foregoing is guayule rubber; in certain such embodiments, the biorubber comprises guayule rubber containing about 1 to about 10% by weight guayule resin, including 1-10% (e.g., 1%, 2%, 3%, 4%, 5%, 6%, 7%, 8%. 9%, or 10%), about 1 to about 7%, 1-7%, about 1 to about 5%, or 1-5% guayule resin. Other examples of biorubbers extended with at least a portion of plant resin from inherent sources of the plant resin include non-Hevea natural rubber from Russian dandelion and Hevea natural rubber which may contain up to about 2% resin, including up to 2% resin, up to about 1.5% resin, up to 1.5% resin, up to about 1% resin, or up to 1% resin (all of the foregoing by weight).

Softener

As discussed above, the sealant composition of the first-third embodiments comprises (includes) a softener which comprises at least one of plant resin or plant oil. In certain embodiments of the first-third embodiments, the softener comprises at least one plant resin. In certain embodiments of the first-third embodiments, the softener consists of at least one plant resin. In certain embodiments of the first-third embodiments, the softener comprises at least one plant oil. In certain embodiments of the first-third embodiments, the softener consists of at least one plant oil. In certain embodiments of the first-third embodiments, the softener consists of at least one plant resin and at least one plant oil.

As used herein, the phrase "plant resin" refers to resins sourced from one or more plants. Such resins are generally viscous (often highly viscous at room temperature) liquids that are insoluble in water. In certain embodiments of the first-third embodiments disclosed herein, the plant resin meets at least one of the following: contains at least a majority by weight of one or more terpenes, or has the property of hardening into a solid after some period of exposure to air (usually measured in days or weeks). As used herein, plant resins are not intended to encompass petroleum resins such as C5 aliphatic and C9 aromatic resins (usually obtained as a by-product of petroleum cracking). Various plant sources of plant resins exist including guayule, conifer, and citrus (e.g., lemon, lime, orange), any of which can be utilized in certain embodiments of the first-third embodiments disclosed herein. Plant resins used in the first-third embodiments disclosed herein may comprise (include) a combination of various types of compounds. In addition to the terpene compounds that comprise the plant resins, other compounds present include, but are not limited to, argentatins and guayulins. In certain embodiments of the first-third embodiments disclosed herein, the plant resin comprises (includes) at least one terpene, at least one argentatin, at least one guayulin, or a combination thereof. Most plant resins will contain both a volatile and non-volatile fraction. In certain embodiments of the first-third embodiments, the volatile fraction may comprise mostly various terpene compounds. The non-volatile fraction may include one or more of: fatty acids (i.e., free fatty acids), argentatins, guayulins, aldehydes, and alcohols. In certain embodiments of the first-third embodiments, the plant resin comprises at least one of (1)-(6) as follows: (1) at least one terpene selected from d-limonene, limonene, alpha-pinene, beta-pinene, d-verbenone, camphene, alpha-thugene, beta-myrcene, delta-3-carene, terpinolene, beta-ocimene, or santolina triene; (2) at least one fatty acid selected from: cinnamic acid, alpha-linoleic acid, beta-linoleic acid, stearic acid, palmitic acid, palmitoleic acid, or oleic acid; (3) at least one argentatin selected from Argentatin A, Argentatin B, or Argentarin C; (4) at least one guayulin selected from Guayulin A, or Guayulin B; (5) at least one fatty acid (as free fatty acid, monoglyceride, diglyceride, triglyceride, or a combination thereof) selected from linoleic acid, cinnamic acid, linolenic acid, palmitic acid, oleic acid, p-anisic acid, or stearic acid; or (6) low molecular weight polyisoprene rubber having a degree of polymerization of less than 400. In certain embodiments of the first-third embodiments, when at least one fatty acid is present, at least a majority of the fatty acids comprises a combination of linoleic, cinnamic, linolenic and palmitic acids. It should be understood that either a naturally-occurring plant resin, a processed plant resin, or both can be utilized in certain embodiments of the first-third embodiments; processed forms of plant resins may contain more or less of certain compounds than their naturally-occurring counterparts. In certain embodiments of the first-third embodiments, the plant resin comprises guayule resin, optionally meeting at least one of the foregoing (1)-(6). In certain embodiments of the first-third embodiments, the plant resin comprises guayule resin wherein at least 40 weight % of the guayule resin comprises a combination of: terpenes and sesquiterpenes, Guayulin A, Guayulin B, cinnamate C, anisate D, Argentatin A, Argentatin B, Argentatin C, triterpenoid D, sterol glycosides, phytosterols and triterpenoids, and fatty acids (as free fatty acid, monoglycerides, diglycerides, triglycerides, or a combination thereof). In certain embodiments of the first-third embodiments, the plant resin comprises a polymerized citrus resin (e.g., polylimonene, polyterpene, etc.); in certain such embodiments, the polymerized citrus resin may be a solid at room temperature. In certain embodiments of the first-third embodiments, the volatile fraction of the plant resin is about 15 to about 30% by weight (based upon the total weight of the plant resin), including 15-30% by weight, 15-25% by weight, and 17-22% by weight; in certain such embodiments the plant resin comprises guayule resin. In certain embodiments of the first-third embodiments, the plant resin comprises about 15 to about 35% by weight (based upon the total weight of the plant resin) of one or more argentatins, including 15-35% by weight, 15-30% by weight, and 17-27% by weight; in certain such embodiments the plant resin comprises guayule resin. In certain embodiments of the first-third embodiments, the plant resin comprises about 10-25% by weight (based upon the total weight of the plant resin) of one or more fatty acids (as free fatty acid, monoglyceride, diglyceride, triglyceride, or a combination thereof), including 10-20% by weight, and 12-17% by weight; in certain such embodiments the plant resin comprises guayule resin.

As used herein, the phrase "plant oil" is intended to refer to ingredients sourced from one or more plants which contain at least a majority by weight of one or more triglycerides, one or more diglycerides, one or more monoglycerides, or a combination thereof. A triglyceride is an ester having a glycerol backbone with three fatty acids bonded thereto whereas a diglyceride has two fatty acids bonded thereto and a monoglyceride has one fatty acid bonded thereto. As used herein, plant oils are not intended to encompass mineral oils or petroleum oils (e.g., paraffinic oil, aromatic oil, naphthenic oil, TRAE oil, TDAE oil, MES oil). In certain embodiments of the first-third embodiments, the plant oil comprises at least 70% by weight of one or more triglycerides, one or more diglycerides, one or more monoglycerides, or a combination thereof. In certain embodiments of the first-third embodiments disclosed herein, the plant oil comprises at least 75%, at least 80%, at least 85%, at least 90%, at least 95%, at least 98%, at least 99% or even 100% by weight of one or more triglycerides, one or more diglycerides, one or more monoglycerides, or a combination thereof; in certain such embodiments the foregoing amounts are comprised of one or more triglycerides in combination with one or more diglycerides. In certain embodiments of the first-third embodiments disclosed herein, the plant oil comprises no more than 15%, no more than 10%, no more than 8%, no more than 5%, no more than 3%, no more than 2%, no more than 1%, or even 0% by weight of free fatty acids and monoglycerides (with the foregoing amounts referring to a total of all free fatty acids and diglycerides present in such plant oil). In certain embodiments of the first-third embodiments disclosed herein, the softener composition comprises no more than 10%, no more than 5%, no more than 3%, no more than 2%, no more than 1%, or even 0% by weight of any petroleum oil.

In those embodiments of the first-third embodiments disclosed herein, where the softener comprises (includes) one or more plant oils, the plant source of the oil(s) may vary and may comprises one or more than one plant. Various plant sources of plant oils exist including grains, nuts and vegetables, any of which can be utilized in certain embodiments of the first-third embodiments disclosed herein. In certain embodiments of the first-third embodiments disclosed herein, the softener comprises (includes) at least one of the following plant oils: soybean oil, palm oil, rapeseed oil, sunflower oil, peanut oil, cottonseed oil, oil produced from palm kernel, coconut oil, olive oil, corn oil, grape seed oil, hazelnut oil, hemp oil, linseed oil, rice oil, safflower oil, sesame oil, mustard oil, or flax oil. In certain embodiments of the first-third embodiments disclosed herein, the softener comprises a combination of plant oils such as more than one of the foregoing plant oil; such a combination of plant oils is sometimes called a vegetable oil. In certain embodiments of the first-third embodiments disclosed herein, the softener comprises (includes) soybean oil. In certain embodiments of the first-third embodiments disclosed herein, the softener comprises (includes) sunflower oil; in certain such embodiments, the sunflower oil comprises high-oleic sunflower oil (e.g., having an oleic acid content of at least 60%, at least 70%, or at least 80% by weight oleic acid). In certain embodiments of the first-third embodiments, oil is present in the sealant composition and the oil comprises 10-70% by weight (e.g., 10%, 15%, 20%, 25%, 30%, 35%, 40%, 45%, 50%, 55%, 60%, 65%, 70%) of the sealant composition; in certain such embodiments, the amount of oil in the sealant composition is no more than 25% by weight of the sealant composition, no more than 20% by weight of the sealant composition, no more than 15% by weight of the sealant composition, no more than 10% by weight of the sealant composition, or no more than 5% by weight of the sealant composition.

According to the embodiments of the first-third embodiments disclosed herein, the relative amounts of plant resin and plant oil used as the softener component can vary. In certain embodiments of the first-third embodiments, the amount of plant resin is about 5 to about 100% by weight of the softener, including 5 to 100% by weight (e.g., 5, 10, 15, 20, 25, 30, 35, 40, 45, 50, 55, 60, 65, 70, 75, 80, 85, 90, 95, 98, or 100% by weight) and the amount of plant oil is 0 to about 95% by weight of the softener, including 0 to 95% by weight (e.g., 0, 5, 10, 15, 20, 25, 30, 35, 40, 45, 50, 55, 60, 65, 70, 75, 80, 85, 90, or 95% by weight). When more than one biorubber is used in the sealant composition of the first-third embodiments, the foregoing amounts and ranges should be understood to refer to the total amount of all biorubbers. In certain embodiments of the first-third embodiments wherein at least 90% of the biorubber has a Mw of 175,000 or less (as discussed above), the relative amount of plant oil as compared to plant resin in the softener may be somewhat less such as about 75 to 100% by weight of the softener, including 75 to 100% by weight (e.g., 75, 80, 85, 90, 95, 98, or 100% by weight) and the relative amount of plant resin may be somewhat more such 0 to about 25% by weight of the softener, including 0 to 25% by weight (e.g., 0, 5, 10, 15, 20, or 25% by weight). When more than one plant oil and/or more than one plant resin is used for the softener of the sealant composition of the first-third embodiments, the foregoing amounts and ranges should be understood to refer to the total amount of all plant resins and the total amount of all plant oils.

Filler

In certain embodiments of the first-third embodiments disclosed herein, the sealant composition further comprises (includes) at least one filler. In certain such embodiments, the at least one filler is present in an amount of up to 20 weight % (based upon the total weight of the sealant composition). In certain embodiments of the first-third embodiments disclosed herein, the sealer composition comprises at least one filler in an amount of about 1 to 20 weight %, including 1 to 20 weight % (e.g., 1%, 2%, 3%, 4%, 5%, 6%, 7%, 8%, 9%, 10%, 11%, 12%, 13%, 14%, 15%, 16%, 17%, 18%, 19%, 20%), 1-15 weight %, 1-10 weight %, 1-8 weight %, 1-5 weight %, 2-15 weight %, 2-10 weight %, 2-8 weight %, 2-5 weight %, 3-15 weight %, 3-10 weight %, 3-8 weight %, 3-5 weight %, 5-15 weight %, 5-10 weight %, or 5-8 weight %. One or more than one filler may be utilized. In certain embodiments of the first-third embodiments the at least one filler can include: at least one reinforcing filler, at least one non-reinforcing filler, or a combination thereof. In certain embodiments of the first-third embodiments disclosed herein, the at least one filler is present in an amount based upon 100 parts of biorubber such as about 1 to about 40 phr or 1-40 phr filler (i.e., parts per 100 parts of biorubber), preferably 5 to about 25 phr or 5-25 phr filler.

As used herein, the term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM Method D6556 (as of the time of filing this application most recently issued as D6556-14 in 2014) or ASTM Method D1993 for silica fillers (as of the time of filing this application most recently issued as D1993-03 (reapproved in 2013)), each of which are B.E.T. nitrogen absorption methods. Additionally or alternatively, the term "non-reinforcing filler" is used to refer to a particulate material that has a particle size of greater than about 1000 nm (including greater than 1000 nm). As used herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 m2/g, and more than 125 $m^2/g$. Additionally or alternatively, the term "reinforcing filler" is used to refer to a particulate material that has a particle size of about 10 nm up to about 1000 nm, including 10 nm up to 1000 nm, about 10 nm up to about 50 nm, and 10 nm up to 50 nm.

In certain embodiments of the first-third embodiments, the sealant composition includes at least one filler selected from: carbon black, silica, clay, starch, calcium carbonate, lignin, a metal oxide, or a cellulose ester. Carbon black fillers and silica fillers are discussed in more detail below. In certain embodiments of the first-third embodiments, the at least one filler comprises (includes) or consists of at least one biofiller; non-limiting examples of biofillers (i.e., fillers that are not sourced from petroleum products or ingredients) include starch, silica, clay, calcium carbonate, lignin, metal oxides, cellulose, cellulose esters, and combinations thereof. Various sources exist for the foregoing biofillers, including plant sources of cellulose and lignin, silica from rice hull ash, and silica or carbon black from plant bagasse. In certain embodiments of the first-third embodiments, the biofiller is added to the sealant composition already incorporated into the biorubber (e.g., as an inherent part of the biorubber); non-limiting examples of such biorubber +filler combinations include guayule rubber containing inherent cellulose from the guayule plant bagasse. In certain embodiments of the first-third embodiments disclosed herein, the sealant composition includes at least one filler comprising carbon black. In certain embodiments of the first-third embodiments disclosed herein, the filler of the sealant composition consists of one or more carbon blacks.

Non-limiting examples of suitable fillers for use in the sealant compositions of certain embodiments of the first-third embodiments disclosed herein include, but are not limited to, carbon black, silica, starch, lignin, cellulose ester, talc, clay, boron nitride, aluminum nitride, titanium dioxide, reinforcing zinc oxide, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_3 4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, and combinations thereof.

Among the useful carbon blacks for use as a filler in certain embodiments of the first-third embodiments disclosed herein are furnace black, channel blacks, lamp blacks, and combinations thereof. More specifically, examples of useful carbon blacks for use as a filler in certain embodiments of the first-third embodiments disclosed herein include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the sealant composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a, which one of skill in the art will understand are reinforcing carbon blacks. According to the first-third embodiments disclosed herein, the carbon blacks utilized can be in pelletized form or an unpelletized flocculent mass; preferably, for more uniform mixing, unpelletized carbon black is preferred. Non-reinforcing carbon black fillers can alternatively or additionally be utilized as a filler in certain embodiments of the first-third embodiments. Non-limiting examples of non-reinforcing carbon blacks for use as a filler in certain embodiments of the first-third embodiments disclosed herein include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada). In certain embodiments of the first-third embodiment, when the sealant composition includes carbon black, the carbon black comprises a recycled carbon black; optionally having one of the foregoing ASTM grades. Recycled carbon black can be sourced from recycled or ground tires.

Non-limiting examples of silica fillers suitable for use in the sealant compositions of certain embodiments of the first-third embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in sealant compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the sealant composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the sealant composition comprises reinforcing silica filler having a pH of about 5.5 to about 7 or slightly over 7, preferably about 5.5 to about 6.8. Some of the commercially available reinforcing silica fillers which can be used in the sealant compositions of certain embodiments of the first-third embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

Cure Package

In certain embodiments of the first-third embodiments disclosed herein, the sealant composition includes a cure package. The ingredients of the cure package allow the sealant composition to "cure" the composition, thereby cross-linking molecular chains of the biorubber. Although the cure package can be understood as enabling curing of the sealant composition, the sealant composition will generally remain tacky or sticky even after curing. According to those embodiments of the first-third embodiments disclosed herein, when the sealant composition includes a cure package, the particular ingredients of the cure package may vary. In certain embodiments of the first-third embodiments disclosed herein, the cure package will include at least one vulcanizing agent and at least one vulcanizing accelerator; in certain such embodiments, the cure package also includes at least one vulcanization activator (e.g., zinc oxide, stearic acid, and the like) and optionally at least one vulcanization inhibitor. Notably, one or more than one of each of the foregoing can be utilized (e.g., one or more than one vulcanizing accelerator). In certain embodiments of the first-third embodiments, the cure package will include a vulcanizing agent; a vulcanizing accelerator; a vulcanizing activator (e.g., zinc oxide, stearic acid, and the like); a vulcanizing inhibitor, and an anti-scorching agent. Notably, one or more than one of each of the foregoing can be utilized (e.g., one or more than one vulcanizing accelerator). In certain embodiments of the first-third embodiments, the cure package includes at least one vulcanizing agent, at least one vulcanizing accelerator, at least one vulcanizing activator, and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired. When amounts of various ingredients of a cure package are discussed below as phr, the term is intended to refer to the parts per 100 parts of biorubber. In certain embodiments of the first-third embodiments, the cure package comprises about 2 to about 15% by weight of the sealant composition, including 2-15% by weight (e.g., 2, 3, 4, 5, 6, 7, 8, 9, 10, 11, 12, 13, 14, 15% by weight), 2-12% by weight, 2-10% by weight, 4-15% by weight, 4-12% by weight, 4-10% by weight, 5-12% by weight, and 5-10% by weight.

Examples of suitable types of vulcanizing agents for use in the sealant compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. In certain embodiments of the first-third embodiments, the vulcanizing agent is present in the sealant composition in an amount ranging from 0.1 to 10 phr (i.e., based upon 100 parts of the biorubber), including from 0.1 to 7.5 phr, including from 0.1 to 5 phr, and preferably from 0.1 to 3.5 phr.

In certain embodiments of the first-third embodiments disclosed herein, the sealant composition includes at least one vulcanizing accelerator. Vulcanizing accelerators are used to control the time and/or temperature required for vulcanization (or curing) and to improve properties of the resulting composition. According to the first-third embodiments disclosed herein, the type and amount of vulcanization accelerator(s) used in the sealant composition may vary. In certain embodiments of the first-third embodiments disclosed herein, the at least one vulcanization accelerator is selected from at least one of the following classes of vulcanization accelerators: thiurams, thioureas, dithiocarbamates, xanthates, or thiophosphates. In certain embodiments of the first-third embodiments, the at least one vulcanization accelerator comprises a thiazole, optionally in combination with one of more vulcanization accelerators from one or more of the foregoing classes. Non-limiting examples of vulcanizing accelerators that belong to the class of thiurams include: TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide). Non-limiting examples of vulcanizing accelerators that belong to the class of thioureas include: ETU (ethylene thiourea), DPTU (N,N-diethyl thiourea), DETU (N,N-dibutylthiourea), and DBTU (diphenyl thiourea). Non-limiting examples of vulcanizing accelerators that belong to the class of dithiocarbamates include: ZDMC (zinc dimethyl dithiocarbamate), ZDEC (zinc diethyl dithiocarbamate), ZDBC (zinc dibutyl dithiocarbamate), ZEDC (zinc N-ethyl-dithiocarbamate), CDMC (copper dimethyl dithiocarbamate) and ZBEC (zinc dibenzyl dithiocarbamate). Non-limiting examples of vulcanizing accelerators that belong to the class of xanthates include: ZIX (zinc isopropyl xanthate). Non-limiting examples of vulcanizing accelerators that belong to the class of thiophosphates include: ZBDP (Zinc-O,O-di-N-phosphorodithioate). Non-limiting examples of vulcanizing accelerators that belong to the class of thiazoles incluee: MBT (2-mercaptobenzothiazole), MBTS (2,2-benzothiazole disulfide), ZMBT (zinc 2-mercaptobenzothiazole) and CMBT (copper 2-mercaptobenzothiazole). Additional examples of suitable vulcanizing accelerators for use in certain embodiments of the first-third embodiments disclosed herein include, but are not limited to, sulfonamides (e.g., N-cyclohexyl-2-benzothiazole-sulfenamide (CBS), N-tert-butyl-2-benzothiazole-sulfenamide (TBBS), and the like); guanidine vulcanization accelerators (e.g., diphenyl guanidine (DPG) and the like); and carbamate vulcanizing accelerators (e.g., zinc dibutyl dithiocarbamate (ZDBC), zinc dibenzyl dithiocarbamate (ZBEC), zinc diethyl dithiocarbamate (ZDEC), zinc dimethyl dithiocarbamate (ZDMC), zinc N-ethyl-dithiocarbamate (ZEDC), copper dimethyl diothiocarbmate (CDMC), and the like), and combinations thereof; such vulcanization accelerators can be used either alone, in combination, or in combination with one of the foregoing classes of vulcanization accelerators. Generally, the total amount of vulcanization accelerator used ranges from 0.5 to 20 phr, 0.5 to 15 phr, 1 to 15 phr, or 2 to 10 phr.

Vulcanizing activators are additives that can be used to support vulcanization. According to embodiments of the first-third embodiments, vulcanizing activators will generally include both an inorganic and organic component. Zinc oxide is the most widely used inorganic vulcanization activator. Various organic vulcanization activators are commonly used including stearic acid, palmitic acid, lauric acid, and zinc salts of each of the foregoing. In certain embodiments of the first-third embodiments, the total amount of vulcanization activator used ranges from 0.1 to 20 phr, 0.5 to 15 phr, or 1 to 15 phr. In certain embodiments of the first-third embodiments the vulcanization activator comprises zinc oxide in an amount of 1 to 15 phr, 2 to 10 phr, or 5 to 10 phr. In certain embodiments of the first-third embodiments, the vulcanization accelerator comprises stearic acid in an amount of 0.1 to 6 phr, 0.5 to 5 phr, or 1 to 4 phr.

Vulcanization inhibitors that can be used to control the vulcanization process and generally retard or inhibit vulcanization until the desired time and/or temperature is reached. In certain embodiments of the first-third embodiments, the vulcanization inhibitor includes PVI (cyclohexylthiophthalmide) from Santogard. In certain embodiments of the first-third embodiments, the amount of vulcanization inhibitor is 0.1 to 3 phr, preferably 0.5 to 2 phr.

Methods for Preparing the Sealant Composition

Various mixing methods can be used for combining the ingredients of the sealant composition. In certain embodiments, the sealant composition is prepared by a process that comprises: providing ingredients including biorubber, softener (i.e., plant resin and/or plant oil), and any filler, and mixing to form a masterbatch which results in the sealant composition. In certain such embodiments, a final batch is prepared from the masterbatch by adding the cure package ingredients thereto and mixing, resulting in the final sealant composition.

In certain embodiments, more than one masterbatch stage may be utilized, e.g., an initial masterbatch followed by a secondary masterbatch or a remill mixing step, particularly when relatively higher amounts of filler(s) are used. The foregoing process options may also (optionally) be utilized in preparing the sealant composition of the first embodiment as well as in preparing the sealant composition for use in the second and third embodiments.

The preparation of the masterbatch(es) and the final batch may generally involve mixing together the ingredients for the sealant composition (as disclosed above) by methods known in the art, such as, for example, by kneading the ingredients together in a Banbury mixer, kneader, or on a milled roll. The term masterbatch as used herein is intended to refer to a non-productive mixing stage, which is known to those of skill in the art and generally understood to be a mixing stage where no vulcanizing agents or vulcanization accelerators are added. The term final batch as used herein is intended to refer to a productive mixing stage, which is also known to those of skill in the art and generally understood to be the mixing stage where the vulcanizing agents and vulcanization accelerators are added into the sealant composition.

In certain embodiments, the sealant composition of the first-third embodiments is prepared by a process including a master batch mixing stage(s) conducted at a temperature of about 80° C. to about 150° C. (e.g., 80, 90, 100, 110, 120, 130, 140 or 150° C.). In certain embodiments, the sealant composition of the first-third embodiments is prepared by a process that also includes a final mixing stage conducted at a temperature below the vulcanization temperature in order to avoid unwanted pre-cure of the sealant composition. Therefore, the temperature of the productive (or final) mixing stage should not exceed about 160° C. (e.g., 80, 90, 100, 110, 120, 130, 140, 150, 160° C.) and is typically about 80° C. to about 150° C. In certain embodiments, the sealant composition of the first-third embodiments is prepared by a process including at least two master batch mixing stages (which may be conducted at the foregoing temperature) wherein at least a majority (e.g., (at least) 51 weight %, (at least) 55 weight %, (at least) 60 weight %, (at least) 65 weight %, (at least) 70 weight %, (at least) 75 weight %, (at least) 80 weight %, (at least) 85 weight %, (at least) 90 weight %, (at least) 95 weight %, (at least) 98 weight %) by weight of any plant oil is added in the second master batch mixing stage; in certain such embodiments, the second master batch mixing stage for at least a majority of oil is only utilized when at least 30 phr of oil (e.g., 30 phr, 40 phr, 50 phr, 60 phr, 70 phr, 80 phr, 90 phr, 100 phr or more) is used in the sealant composition.

Tires

As discussed above, according to the second embodiment disclosed herein, a tire comprising at least one component in contact with a sealant composition according to the first embodiment is disclosed. In other words, the second embodiment disclosed herein should be understood as being directed to a tire comprising at least one component in contact with a sealant composition wherein the sealant composition has a composition as described above. According to certain embodiments of the second embodiment, the tire comprises at least one of the following components: a tread, one or more body/carcass plies, one or more cap plies, one or more belt plies, a sidewall, or an air barrier. As used herein, the term "air barrier" should be understood as including traditional type innerliners (e.g., a rubber layer made of butyl and/or halogenated-butyl rubber) as well non-traditional innerliners (e.g., spray-on, paint-on, films made of plastics or polymers other than butyl rubber, or a press-on type innerliner with removable film backing). In certain embodiments of the second embodiment, the tire component in contact with the sealant composition comprises or consists of an innerliner, optionally an innerliner comprising a rubber layer made of butyl and/or halogenated butyl rubber (which rubber layer may be wrapped around the annual beads of the sidewalls of the tire). In certain embodiments of the second embodiment, the tire component in contact with the sealant composition comprises or consists of a body ply. As used herein, the term "body ply" refers to a rubber ply wrapped circumferentially around the tire and extending from one annual bead to the other. As used herein, the term "carcass ply" is used to refer to a type of body ply positioned radially inward of the tread, extending from bead to bead, and generally comprises a layer of rubber-covered textile cords. The cords of the carcass ply may be positioned radially or diagonally (i.e., not circumferentially). When more than one carcass ply is utilized, each may be positioned such that their cord direction differs (e.g., biased to each other). As used herein, the term "belt ply" refers to one or more layers of rubber-covered steel cord generally positioned radially inward of the tread but radially outward of any body or carcass plies. In certain embodiments of the second embodiment, the tire contains sealant composition positioned between the inner liner and the body ply. In certain embodiments of the second embodiment where the tire component in contact with the sealant composition comprises or consists of an innerliner (optionally an innerliner comprising a rubber layer made of butyl and/or halogenated butyl rubber which rubber layer may be wrapped around the annual beads of the sidewalls of the tire), the sealant composition is positioned on the radially inward surface of the innerliner.

According to the second embodiment, the sealant composition may be applied to at least one component of the tire according to various methods. Non-limiting examples of those methods include the methods of the third embodiment, as discussed below. Generally, any method which enables the sealant composition to contact at least one component of the tire can be utilized. In certain embodiments of the second embodiment, any method which enables the sealant composition to at least partially coat at least one surface of the tire component can be utilized. In certain embodiments of the second embodiment, the sealant composition coats or covers at least a majority of at least one surface of the tire component and is applied thereto from bead to bead or from belt edge to belt edge. In certain embodiments of the second embodiment, the sealant composition coats or covers at least 60%, at least 70%, at least 80%, at least 90%, at least 95%, at least 98%, at least 99% or even 100% of at least one surface of the tire component and is applied from bead to bead or from belt edge to belt edge. Preferably, the at least one surface of the tire component comprises the radially inward surface of that tire com ponent.

Methods for Applying Sealant Composition to Tire Components

As discussed above, according to the third embodiment disclosed herein, a method for applying a sealant composition to a tire is disclosed. The method comprises: providing a tire comprising at least one of the following components: a tread, one or more body or carcass plies, one or more cap plies, one or more belt plies, a sidewall, or an air barrier layer; and applying a sealant composition according to the first embodiment to a portion of at least one radially inner surface, a portion of at least one radially outer surface, or portions of both radially inner and radially outer surfaces.

In certain embodiments of the third embodiment, the tire is cured prior to applying the sealant composition. In certain embodiments of the third embodiment, the tire is cured prior to applying the sealant composition and an air barrier layer is added to the tire after applying the sealant composition to the cured tire; in certain such embodiments, the air barrier layer is a non-traditional inner liner (e.g., spray-on, paint-on, films made of plastics or polymers other than butyl rubber, or a press-on type innerliner with removable film backing). In certain embodiments of the third embodiment, the sealant composition is applied to the component of the tire so that it is positioned between the body ply and innerliner.

According to the third embodiment disclosed herein, the particular method by which the sealant composition is applied to at least a portion of the surface of at least one component of the tire is not particularly limited. In certain embodiments of the third embodiment, the applying of the sealant composition comprises at least one of: painting, pouring, spraying, or pressing. According to certain embodiments of the foregoing, the sealant composition may be calendered into a layer prior to applying to the tire component. In certain embodiments of the third embodiment, the sealant composition is combined with a removable backing enabling the sealant composition side to be applied to the tire component followed by removal of the backing material.

According to the third embodiment disclosed herein, the temperature of the sealant composition when applied to the tire component may vary. In certain embodiments of the third embodiment, the sealant composition is heated above room temperature (i.e., above 25° C.) prior to being applied to the tire component; in certain such embodiments, the sealant composition is heated to a temperature of about 50 to about 150° C. (e.g., 50° C., 60° C., 70° C., 80° C., 90° C., 100° C., 105° C., 110° C., 115° C., 120° C. , 125° C. , 130° C. , 135° C., 140° C., 145° C., or 150° C.), including about 60 to about 140° C., and 60-140° C. As those of skill in the art will appreciate, when heating the sealant composition prior to application to the tire component, a temperature that cause the sealant composition to scorch should be avoided. The particular temperature at which the sealant composition will scorch will depend upon the particular ingredients selected (e.g., the biorubber(s), plant resin(s) and/or plant oil(s), and cure package). The foregoing temperatures refer to the temperature to which the sealant composition is heated (e.g., as could be determined by a temperature probe inserted into a container of the heated sealant composition). Preferably, when the sealant composition is heated prior to being applied to the tire component, the maximum temperature of heating will be less than the scorch temperature of the sealant composition. In certain embodiments of the third embodiment, the sealant composition is heated to one of the foregoing temperatures and maintained (or held) at such temperature for a period of time such as about 5 minutes to about 1 hour (e.g., 5 minutes, 10 minutes, 15 minutes, 20 minutes, 25 minutes, 30 minutes, 40 minutes, 45 minutes, 50 minutes, or 1 hour), preferably about 15 minutes to about 40 minutes; in certain such embodiments during the time that the sealant composition is maintained or held at one of the foregoing temperatures it is mixed or otherwise agitated. Heating the sealant composition to a relatively higher temperature above room temperature (e.g., at least 100° C.) may eliminate the need to hold the sealant composition at an elevated temperature for one of the foregoing time periods.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the particular softener utilized in the examples can be utilized with biorubbers, fillers, and other ingredients each of which differ in amount, composition, or both from those used in the examples (i.e., as fully disclosed in the preceding paragraphs).

Example 1

A sealant composition was prepared using the ingredients listed in Table 1. The polyfarnesene used for the biorubber was obtained from Kuraray Co., Ltd, and had a molecular weight (Mw) of 135 kD (kilo-Daltons), a Tg of −71° C., and a viscosity (at 38° C.) of 69 Pa*s. The filler utilized was carbon black, more specifically a N300 series reinforcing carbon black. The softener utilized was guayule resin. The non-petroleum content of the sealant composition was 80 weight % (based upon the total weight of the sealant composition and without including the stearic acid as a non-petroleum ingredient). The amounts provided in Table 1 can be understood in terms of parts or phr (e.g., the non-rubber ingredients are listed based upon 100 parts of biorubber).

TABLE 1

| Ingredient | Amount (phr) |
| --- | --- |
| Polyfarnesene | 100 |
| Carbon black | 16 |
| Guayule resin | 30 |
| Vulcanizing agent (sulfur) | 0.6 |
| Vulcanization activator #1 (Stearic acid) | 2.4 |
| Vulcanization activator #2 (Zinc oxide) | 8.4 |
| Vulcanization accelerator (TBzTD) | 4.2 |

In order to prepare the sealant composition, the ingredients of Table 1 were mixed according to the procedure provided in Table 2, using a mixer.

TABLE 2

| Mixing Parameters | | |
| --- | --- | --- |
| Stage | Time (total) | Condition |
| Masterbatch Stage 1 (initial temp: 90° C., rotor rpm started at 60) | 0 seconds 30 seconds | Charge polymer(s). Charge carbon black and resin in amounts as indicated in Table 1, maintain rotor at 60 rpm and temperature at 90° C. |
| Final Batch Stage (initial temp: 90° C.) | 60 seconds | Charge curatives while maintaining rotor at 60 rpm and temperature at 90° C. |
| | 1800 seconds | Raise temperature to 130° C., reduce rotor speed to 30 rpm and maintain temperature at 130° C., drop at end of time. |

The viscosity of the sealant composition of Example 1 can be measured as a real dynamic viscosity, and determined using an Alpha Technologies RPA (Rubber Process Analyzer) instrument which is rotorless. Measurements can be made following the guidance of, but not strictly according to ASTM D 6204., and in accordance with ASTM D 6204, a three point frequency sweep can be conducted. The rubber compositions may be pre-heated for 1 minute at 100° C. and in accordance with the ASTM procedure, a strain sweep can be conducted at 100° C., strain at 50 percent, 1 Hz, and 1 minute. Viscosity data can be reported from a run conducted at 266° F., G' at 0.2 minutes.

Examples 2 and 3

A sealant composition is prepared using the ingredients listed in Table 3. A guayule rubber as the biorubber is obtained from a pilot processing and has a molecular weight (Mw) of 1.3 million grams/mole a Mn of about 450,000 grams/mole (by GPC using a polystyrene standard), a Tg of −60° C., and a ML(1+4) Mooney viscosity of 95. The polyfarnesene is as described in Example 1. The filler utilized is carbon black, more specifically a N300 series reinforcing carbon black. The softener utilized is soybean oil from Archer Daniels Midland (ADM). The non-petroleum content of the sealant composition is listed below in weight % (based upon the total weight of the sealant composition). The amounts provided in Table 3 can be understood in terms of parts or phr (e.g., the non-rubber ingredients are listed based upon 100 parts of biorubber). In order to prepare the sealant compositions of Examples 2 and 3, the ingredients of Table 3 are mixed according to the same procedure as provided in Table 2 above. Since relatively more of the polyfarnesene is utilized in Example 3 as compared to Example 2 the amount of soybean oil was lowered to 200 phr from 300 phr.

TABLE 3

| Ingredient | Amount (phr) Example 2 | Amount (phr) Example 3 |
| --- | --- | --- |
| Guayule natural rubber | 80 | 60 |
| Polyfarnesene | 20 | 40 |
| Carbon black | 20 | 20 |
| Soybean oil | 300 | 200 |
| Guayule resin | 20 | 20 |
| Vulcanizing agent (sulfur) | 1 | 1 |
| Vulcanization activator#1 (Stearic acid) | 3 | 3 |
| Vulcanization activator #2 (Zinc oxide) | 10 | 10 |
| Vulcanization accelerator (TBzTD) | 5 | 5 |
| Total parts | 459 | 359 |
| % by weight non-petroleum | 92 | 89 |

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for applying a sealant composition to a tire, the method comprising
    providing a tire comprising at least one of the following components: a tread, one or more body or carcass plies, one or more cap plies, one or more belt plies, a sidewall, or an air barrier layer.
    applying a sealant composition to at least a portion of at least one radially inner surface of at least one of the components of the tire
    wherein the sealant composition comprises
    biorubber in an amount of about 15 to about 90 weight %, based upon the total weight of the sealant composition; and a softener comprising at least one of plant resin or plant oil, in an amount of about 10 to about 85 weight %, based upon the total weight of the sealant composition, and
    optionally a cure package,
    wherein the sealant composition contains at least 70 weight %, based upon the total weight of the sealant composition, non-petroleum ingredients including the biorubber, and plant resin or plant oil, and
    the sealant composition has a viscosity of 200 to 500 Pa-S at 100° C.

2. The method of claim 1, wherein the tire is cured prior to applying the sealant composition, and an air barrier layer is added to the tire after applying the sealant composition to the cured tire.

3. The method of claim 1, wherein the sealant composition further comprises at least one filler in an amount of up to 20 weight %, based upon the total weight of the sealant composition.

4. The method of claim 1, wherein
the biorubber is present in an amount of about 15 to about 90 weight %, based upon the total weight of the sealant composition, and
the softener is present in an amount of about 10 to about 85 weight %, based upon the total weight of the sealant composition.

5. The method of claim 1, wherein the softener comprises a plant resin, the plant resin is present in an amount of 10 to 45 weight %, based upon the total weight of the sealant composition, and the biorubber:plant resin weight ratio is greater than 1:1.

6. The method of claim 1, wherein the softener comprises a plant oil.

7. The method of claim 1, wherein
the biorubber comprises at least one of polyfarnesene, non-Hevea natural rubber, Hevea natural rubber, or a polymer or copolymer comprising at least one conjugated diene-containing non-petroleum monomer optionally in combination with at least one aromatic vinyl non-petroleum monomer.

8. The method of claim 1, wherein the softener comprises a plant resin comprising guayule resin, conifer resin, citrus resin, or a combination thereof.

9. The method of claim 8, wherein the plant resin comprises at least one terpene, at least one argentatin, at least one guayulin, or a combination thereof.

10. The method of claim 1, wherein the biorubber comprises polyfarnesene having a molecular weight (Mw) of less than 500,000 kDa.

11. The method of claim 3, wherein the at least one filler is selected from the group consisting of carbon black, silica, clay, starch, calcium carbonate, lignin, metal oxidex, and cellulose ester.

12. The method of claim 1, wherein the sealant composition meets at least one of the following:
 a. has a viscosity of about 300 to about 400 Pa-S at 100° C.,
 b. contains no more than 5% by weight water, based upon the total weight of the sealant composition,
 c. contains no more than 25% by weight of an elastomer/rubber that is solid at room temperature, based upon the total weight of the sealant composition,
 d. contains 10 to 70% by weight oil, based upon the total weight of the sealant composition,
 e. the cure package is present and comprises about 2 to about 15 weight %, based upon the total weight of the sealant composition;
 f. carbon black is present as filler; or
 g. the softener comprises guayule resin.

13. The method of claim 12, wherein each of (a)-(g) is met.

14. The method of claim 1, wherein the biorubber is extended with at least a portion of the plant resin and/or plant oil.

15. The method of claim 1, wherein the biorubber comprises polyfarnesene in an amount of about 50 to about 70 weight %, based upon the total weight of the sealant composition, and the softener comprises guayule resin in an amount of about 10 to about 30% by weight, based upon the total weight of the sealant composition.

16. The method of claim 1, wherein the softener comprises guayule resin in an amount of about 10 to about 30% by weight, based upon the total weight of the sealant composition.

17. The method of claim 1, wherein the biorubber comprises polyfarnesene in an amount of about 20 to about 40% by weight, based upon the total weight of the biorubber, and the softener comprises guayule resin in an amount of about 5 to about 20% by weight, based upon the total weight of the softener.

18. A method for applying a sealant composition to a tire, the method comprising
providing a tire comprising at least one of the following components: a tread, one or more body or carcass plies, one or more cap plies, one or more belt plies, a sidewall, or an air barrier layer,
applying a sealant composition to at least a portion of at least one radially inner surface of at least one of the components of the tire,
wherein the sealant composition comprises
biorubber in an amount of about 15 to about 80 weight %, based upon the total weight of the sealant composition; and a softener comprising at least one of plant resin or plant oil, in an amount of about 20 to about 85 weight %, based upon the total weight of the sealant composition, at least one filler in an amount of up to 20 weight %, based upon the total weight of the sealant composition, and a cure package,
wherein the sealant composition contains no more than 5% by weight water, based upon the total weight of the sealant composition, and contains at least 90 weight %, based upon the total weight of the sealant composition, non-petroleum ingredients including the biorubber, and plant resin or plant oil, and
the sealant composition has a viscosity of 200 to 500 Pa-S at 100° C.

19. The method of claim 18, wherein the softener comprises guayule resin in an amount of about 10 to about 30% by weight, based upon the total weight of the sealant composition.

20. The method of claim 18, wherein the biorubber comprises polyfarnesene in an amount of about 20 to about 40% by weight, based upon the total weight of the biorubber, and the softener comprises guayule resin in an amount of about 5 to about 20% by weight, based upon the total weight of the softener.

* * * * *